(12) United States Patent
Mleczko et al.

(10) Patent No.: US 12,734,981 B2
(45) Date of Patent: Sep. 15, 2026

(54) ELECTRONIC MODULE WITH SELF-RETAINING FEATURE AND METHOD OF USING SAME

(71) Applicant: Aptiv Technologies AG, Schaffhausen (CH)

(72) Inventors: Jamie Mleczko, Oxford, MI (US); David Siener, Clarkston, MI (US); Ayush Lal, Troy, MI (US)

(73) Assignee: Aptiv Technologies AG, Schaffhausen (CH)

( * ) Notice: Subject to any disclaimer, the term of this patent is extended or adjusted under 35 U.S.C. 154(b) by 192 days.

(21) Appl. No.: 18/597,353

(22) Filed: Mar. 6, 2024

(65) Prior Publication Data

US 2024/0300427 A1 Sep. 12, 2024

Related U.S. Application Data

(60) Provisional application No. 63/451,119, filed on Mar. 9, 2023.

(51) Int. Cl.
*B60R 16/023* (2006.01)
*H02G 3/08* (2006.01)

(52) U.S. Cl.
CPC ......... *B60R 16/0239* (2013.01); *H02G 3/081* (2013.01)

(58) Field of Classification Search
CPC .. B60R 16/0239; B60R 16/023; H02G 3/081; H02G 3/08
USPC ........................................................ 174/520
See application file for complete search history.

(56) References Cited

U.S. PATENT DOCUMENTS

2013/0142588 A1 6/2013 Slater et al.
2024/0140582 A1* 5/2024 Whelan ............... B63B 17/0027

FOREIGN PATENT DOCUMENTS

EP 2369189 A1 9/2011
EP 3257340 B1 12/2018

OTHER PUBLICATIONS

"Extended European Search Report mailed on Sep. 11, 2024", 9 Pages.

* cited by examiner

*Primary Examiner* — Tremesha W Burns
(74) *Attorney, Agent, or Firm* — Harness, Dickey & Pierce, P.L.C.

(57) ABSTRACT

A system for housing electronic components for a vehicle includes an electronic housing module. The electronic housing module is configured to house electronic components therein. A flange for securing the electronic housing module to a substrate includes a flat surface and an aperture extending through the flange. A self-retaining feature is positioned within the aperture of the flange. The self-retaining feature includes a metal cylinder including a side wall, an inner cylinder wall, and an opening extending through the metal cylinder along a cylindrical axis. A plurality of deformable features extends radially inward from the inner cylindrical wall of the self-retaining feature. A threaded stud is received through the opening of the metal cylinder and a nut is secured to the threaded stud.

20 Claims, 7 Drawing Sheets

ELECTRONIC MODULE WITH SELF-RETAINING FEATURE AND METHOD OF USING SAME

CROSS-REFERENCE TO RELATED APPLICATIONS

This application claims the benefit of and priority to U.S. Provisional Application 63/451,119, titled "ELECTRONIC MODULE WITH SELF-RETAINING FEATURE AND METHOD OF USING SAME", filed Mar. 9, 2023, the contents of which are incorporated by reference herein.

TECHNICAL FIELD

The present disclosure relates generally to an electronic module with a self-retaining feature to secure electronic components to a vehicle.

BACKGROUND

In general, an electronic housing module may secure one or more electronic components to a chassis (i.e., frame) of a vehicle. Electronic housing modules are generally formed of a polymer material (e.g., plastic). The polymer material is light weight, corrosion resistant, waterproof (or weather resistant), low cost, electrically insulative, and/or provides vibrational dampening. The electronic housing module is secured to a vehicle chassis via a metal stud or thread fastener inserted through the electronic housing module. In some cases, the electronic housing module includes plastic clips to engage the metal stud or fastener. The plastic clips may be fragile and/or require two hands for proper assembly (i.e., one hand to hold the electronic housing module in-place and a second hand to fasten the nut/bolt to the stud). Over time, the electronic housing module may experience polymer creep (i.e., deformation of the electronic housing module) as the polymer is deformed by the harder, metal stud/fasteners. In some cases, the contact between the electronic housing and the metal fastener may loosen over time, causing the electronic housing module to shift as the vehicle moves. Therefore, there is a need for an electronic housing module that is resistant to polymer creep and configured for a simplified (i.e., single handed) assembly.

OVERVIEW

According to some embodiments, a system for housing electronic components for a vehicle includes an electronic housing module. The electronic housing module is configured to enclose electronic components therein. A flange for securing the electronic housing module to a substrate includes a flat surface and an aperture extending through the flange. A self-retaining feature is positioned within the aperture of the flange. The self-retaining feature includes a metal cylinder including a side wall, an inner cylinder wall, and an opening extending through the metal cylinder along a cylindrical axis. A plurality of deformable features extends radially inward from the inner cylindrical wall of the self-retaining feature. A threaded stud is received through the opening of the metal cylinder and a nut is secured to the threaded stud.

According to some embodiments, an electronics module for a vehicle includes a housing, a flange, and a self-retaining feature. The housing includes one or more electronics components therein. The flange includes an aperture extending through the flange. The self-retaining feature includes a metal cylinder including a side wall, an inner cylindrical wall, and an opening extending through the metal cylinder in an axial direction. An elastomeric cylinder is positioned on the inner cylindrical wall. The elastomeric cylinder includes a plurality of ribs extending radially inward from an inner wall of the elastomeric cylinder.

According to some embodiments, a self-retaining feature for limiting compression of a flange includes a metal cylinder. The metal cylinder includes a cylindrical side wall, a first end, a second end, and an opening extending between the first end and the second end through the metal cylinder along a cylindrical axis. A gap in the side wall of the metal cylinder extends along an axial direction from the first end to the second end. A plurality of deformable features extends radially inward from the cylindrical side wall.

These and other examples and features of the present devices, systems, and methods will be set forth, at least in part, in the following Detailed Description. This Overview is intended to provide non-limiting examples of the present subject matter—it is not intended to provide an exclusive or exhaustive explanation. The Detailed Description below is included to provide further information about the present devices, systems, and methods.

BRIEF DESCRIPTION OF DRAWINGS

This written disclosure describes illustrative embodiments that are non-limiting and non-exhaustive. Reference is made to illustrative embodiments that are depicted in the figures, in which.

DETAILED DESCRIPTION

Figure 1A:
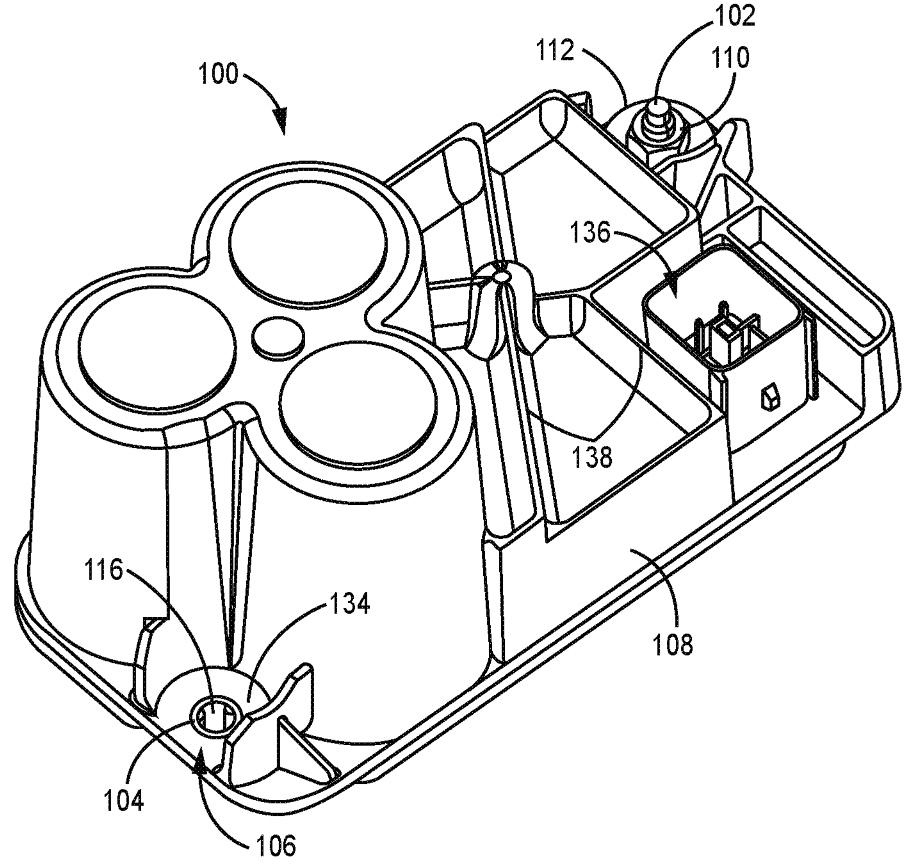
FIG. 1A illustrates an isometric view of an electronic housing module, according to some embodiments.

According to some embodiments, this disclosure relates to devices, systems, and methods for securing an electronics housing module to a vehicle substrate (e.g., a chassis or frame). In some embodiments, an electronics housing module includes a housing formed from a polymer or polymeric material (e.g., a polymer plastic). The housing receives one or more electronic components therein, including for example, circuitry, printed circuit board assemblies, wiring assemblies, power storage components, power delivery components, electronic processing units (ECUs), etc. The electronics housing module includes one or more flanges configured to receive and/or secure one or more fastener components to secure the electronics housing module to the vehicle chassis. The electronics housing module includes an aperture on or adjacent to the flange to receive a fastener component therethrough. The one or more fastener components may be formed from metal and/or a metal alloy. A nut and/or a washer may be secure to the fastener component inserted through the aperture to secure the electronics housing module to the vehicle substrate. A self-retaining feature is positioned within the aperture of the electronics housing module. The self-retaining feature includes a metal cylinder having an opening extending therethrough along a cylindrical axis. The self-retaining feature includes a plurality of deformable features positioned within the opening of the metal cylinder. The plurality of deformable features may be formed of an elastomeric material and extend radially inward from an inner wall of the metal cylinder. The plurality of deformable features is configured to engage (or contact) the fastener component (i.e., stud) inserted through the opening in the metal cylinder.

In some embodiments, the contact between the plurality of deformable features and the fastener component self-retains (i.e., holds in-place) the electronics housing module on the fastener component prior to the nut and/or washer being fastened onto the fastener component. The self-retaining feature may engage the washer and/or bolt fastened to the fastener component. This is beneficial, as an installer can install the electronic housing module to a vehicle substrate with one hand, even if the electronic housing module is installed on a vertical side wall or upside down (i.e., if gravity is pulling the electronic housing module off of the fastener component, the self-retaining function can resist gravity and keep the module in-place).

In some embodiments, the self-retaining feature bears the load from the washer and/or bolt (or nut) fastened to the fastener component, i.e., the compressive force between the washer/bolt and the vehicle substrate may be distributed to the metal cylinder of the self-retaining feature. The compressive (or clamping force) is directed away from the (softer) polymer flange via the metal cylinder, reducing polymer creep that would occur if the clamping force was applied directly to the polymer flange. This is beneficial, as it reduces polymer creep and/or deformation of the electronic housing module.

In some embodiments, the self-retaining feature is more durable during the assembly process as compared to a plastic clip retaining feature. For example, if the fastener component is misaligned with the opening of the metal cylinder during insertion, the metal cylinder is unlikely to break or deform. In contrast, if the stud is misaligned with a plastic clip retaining feature or pivots on the stud, one of more of the plastic clips may break or deform.

Figure 1B:
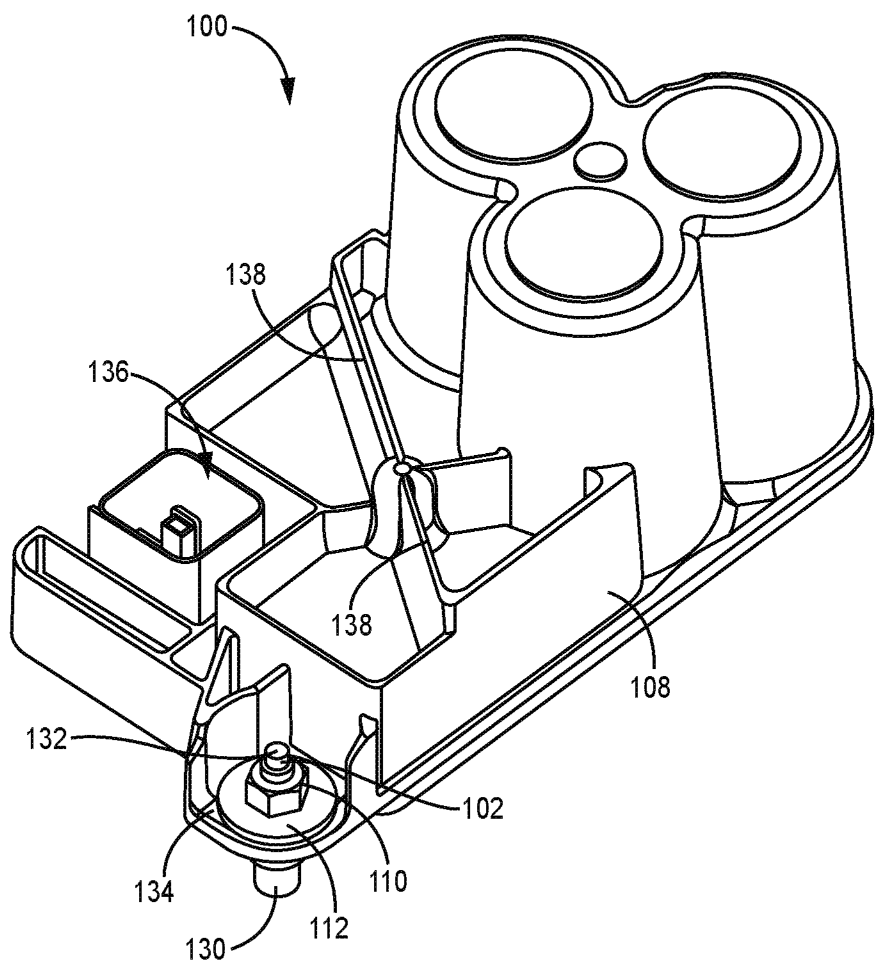
FIG. 1B illustrates an isometric view of the electronic housing module of FIG. 1A, according to some embodiments.

FIGS. 1A-B illustrate isometric views of an electronic housing module 100, according to some embodiments. The electronic housing module 100 includes a housing 108, a flange 106, an aperture 104, a stud 102, a nut 110, a washer 112, and a self-retaining feature 116, according to some embodiments. The electronic housing module 100 is securable to a vehicle substrate (not shown), e.g., a vehicle chassis or frame. For instance, a first end 130 of the stud 102 may be in-contact with or secure to the vehicle substrate and a second end 132 of the stud 102 may be in-contact with or secure to the washer 112 and/or the nut 110. The flange 106 of the electronic housing module 100 is secured between the washer 112 (and/or the nut 110) and the vehicle substrate. In some embodiments, the stud 102 and the nut 110 are threaded, and are threadingly coupled to urge the nut 110 (and/or the washer 112) toward a surface 134 of the flange 106. Threadingly coupling the nut 110 to the stud 102 (i.e., fastening or tightening) thereby clamps the flange 106 of the electronic housing module 100 between the washer 112 (and/or the nut 110) and the vehicle substrate.

In some embodiments, the vehicle substrate is positioned above the electronic housing module 100 (i.e., the second end 132 of the stud 102 hangs below the first end 130 of the stud 102). Thus, the electronic housing module 100 hangs from the vehicle substrate. In other embodiments, the electronic housing module 100 is secured to a substantially vertical side wall (orthogonal to a ground plane) of the vehicle (i.e., the stud 102 is substantially parallel to a ground plane). In either case, installation of the electronic housing module 100 to the vehicle substrate may be difficult, as the installer must hold the electronic housing module 100 in-place (on the stud 102) with a first hand and simultaneously secure the washer 112 and/or nut 110 to the stud 102 with a second hand.

In some embodiments, the electronic housing module 100 receives one or more electronic components within the housing 108, including for example, circuitry, printed circuit board assemblies, wiring assemblies, power storage components, power delivery components, electronic processing units (ECUs), etc. The electronic housing module 100 includes a port 136 (i.e., an electrical connector terminal) configured to secure signal wires and/or power delivery wires (not shown) to the one or more electronic components disposed within the electronic housing module 100. In some embodiments, the housing 108 of the electronic housing module 100 includes one or more ridges 138 configured to provide structural support and/or mate with other components within the vehicle.

In some embodiments, the self-retaining feature 116 is positioned within (and/or aligned with) the aperture 104. For instance, the self-retaining feature 116 is positioned radially inward of an inner surface of the aperture 104. In some embodiments, the inner surface of the aperture 104 has a first diameter and an outer surface of the self-retaining feature has a second diameter approximately equal to the first diameter, and thus, a friction fit, force fit, and/or press fit matingly couples the self-retaining feature 116 to the aperture 104. The aperture 104 includes a center point that is aligned with a cylindrical axis of the self-retaining feature 116, according to some embodiments.

In some embodiments, the flange 106 includes a flat surface 134 adjacent to the aperture 104. The first end of the self-retaining feature 116 is raised above (i.e., slightly protruding from) the flat surface 134. The washer 112 (or in other embodiments, the nut 110) contacts the first end of the self-retaining feature 116 and the flat surface 134 of the flange 106. The washer 112 and/or nut 110 provide a compressive force on the self-retaining feature 116 and/or flange 106, as the nut 110 is tightened on the stud 102 (i.e., the washer 112 and/or nut 110 are urged toward the flat surface 134 of the flange 106). The compressive force (compressive load or clamp force) is distributed to the self-retaining feature 116 and the flange 106. Because the flange 106 is formed from a polymeric material (e.g., a plastic polymer) the compressive force of the washer 112 and/or nut 110 (metal components less susceptible to deformation) may deform or damage the flange 106. In some embodiments, the self-retaining feature 116 is resistant to the compressive force (e.g., the self-retaining feature may include a metal cylinder resistant to deformation in an axial direction) and therefore bears a majority of the compressive load. In other words, the compressive load is redirected from the flange 106 to the self-retaining feature 116. Thus, the self-retaining feature 116 limits the compressive force applied to the flange 106 and thereby protects the flange 106 from deformation and/or polymer creep. In some embodiments, first end of the self-retaining feature 116 is positioned substantially flush with (i.e., at approximately the same level) the flat surface 134.

Figure 2A:
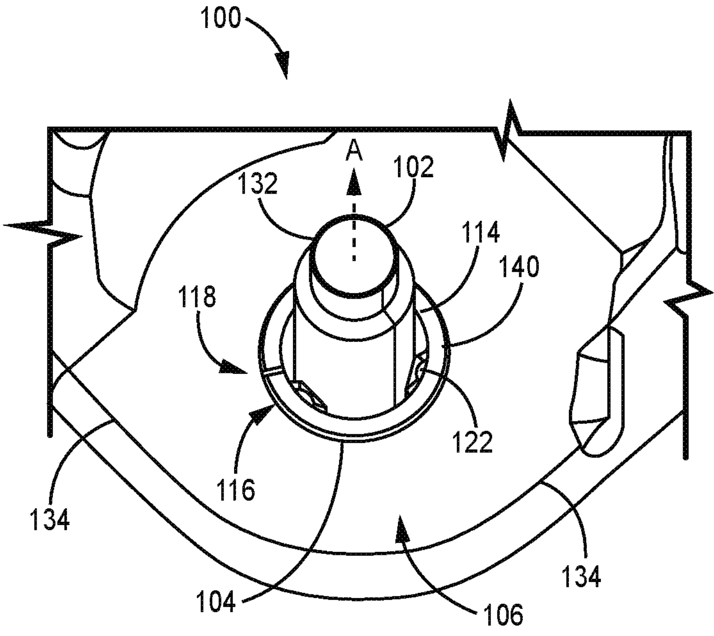
FIG. 2A illustrates an isometric view of a flange and a self-retaining feature on the electronic housing module, according to some embodiments.

FIG. 2A illustrates an isometric view of the flange 106 and the self-retaining feature 116 of the electronic housing module 100, according to some embodiments. The self-retaining feature 116 is positioned within the aperture 104 on the flange 106. The self-retaining feature 116 includes a first end surface 140 positioned flush with, or in some embodiments, positioned above, the flat surface 134 of the flange 106. The self-retaining feature 116 includes a metal cylinder 114 and an elastomeric cylinder 122 positioned radially inward from the metal cylinder 114. In some embodiments, the metal cylinder 114 includes a gap 118 (i.e., an open slot) through a side wall of the metal cylinder 114. In some embodiments, the gap 118 enables the metal cylinder 114 to flex, e.g., to expand and/or contract circumferentially, to be received within the aperture 104 of the flange 106. For example, the metal cylinder 114 is circumferentially compressed via flexing of the gap 118 prior to insertion within the aperture 104. After the self-retaining feature 116 is properly positioned within the aperture 104, the metal cylinder 114 may recoil (expand circumferentially) to form a press fit/friction fit within the aperture 104. In some embodiments, the gap 118 enables the metal cylinder 114 to flex, e.g., to expand and/or contract circumferentially, in response to insertion and removal or the stud 102.

Figure 2B:
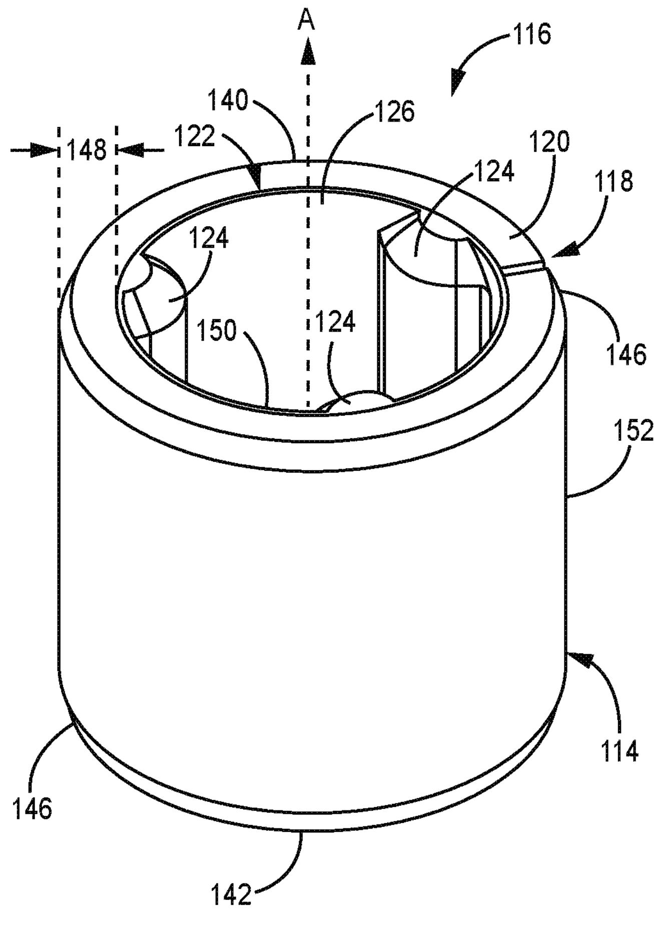
FIG. 2B illustrates an isometric view of a self-retaining feature, according to some embodiments.
Figure 2C:
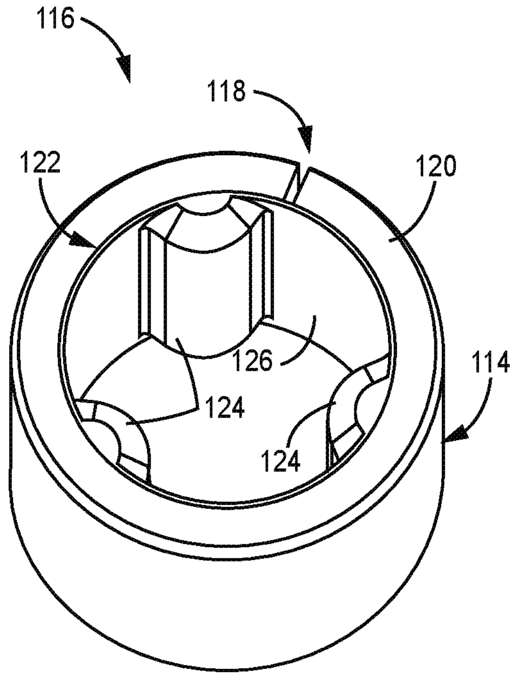
FIG. 2C illustrates a top isometric view of a self-retaining feature, according to some embodiments.

FIGS. 2B-C illustrate isolated isometric views of the self-retaining feature 116, according to some embodiments. The metal cylinder 114 of the self-retaining feature 116 includes a first end 140, a second end 142, and a side wall 120 having an outer surface 152 and an inner surface (not shown) separated by a side wall thickness 148. In some embodiments, the first end 140 and the second end 142 each include an angled edge 146 to guide the self-retaining feature 116 into the aperture 104. The metal cylinder 114 includes an opening through the body of the cylinder centered on a cylindrical axis A. The metal cylinder 114 includes a gap 118 through the side wall 120 to enable the metal cylinder 114 to flex, e.g., to expand and/or contract circumferentially.

In some embodiments, the elastomeric cylinder 122 includes a plurality of ribs 124 and an elastomeric side wall 150 including an inner surface 126. The elastomeric side wall 150 is positioned radially inward from the side wall 120 of the metal cylinder 114, and in some embodiments, the inner surface of the side wall 120 engages the elastomeric side wall 150. The elastomeric cylinder 122 is formed from an elastomeric material (i.e., an elastomer having flexible, compliant, and/or deformable qualities). The elastomeric cylinder 122 includes an opening extending through the body of the cylinder centered on the cylindrical axis A. In some embodiments, the plurality of ribs 124 are formed from the elastomeric material. In the embodiment shown in FIGS. 2A-C, the elastomeric cylinder 122 includes three, equally spaced (120° separation from each other) ribs each defining a semi-circular shape. In other embodiments, the plurality of ribs 124 include four or more ribs, unequal spacing from each other, and/or non-circular shapes (i.e., polygons and/or shapes with concave surfaces). In some embodiments, the elastomeric material includes an ethylene propylene diene monomer (EDPM) rubber having a Shore-A durometer of 30-75, and more preferably 50-75, to provide a holding force and a chemical resistance desired for automotive applications.

In some embodiments, the stud 102 is received within the opening of the self-retaining feature 116 (see e.g., FIG. 2A). The outer surface of the stud 102 engages the plurality of ribs 124 of the self-retaining feature 116. In some embodiments, one or more of the plurality of ribs 124 formed from the elastomeric material are deformed by the stud 102, as for example, the stud 102 urges the deformable ribs away from the central cylindrical axis A. The plurality of ribs 124 form a friction fit (or a force fit/press fit) with the stud 102, according to some embodiments. In some embodiments, receiving the stud 102 through the opening urges the metal cylinder 114 to flex circumferentially, i.e., the gap 118 expands as the stud 102 urges the deformable ribs away from the central cylindrical axis A. The expansion of the gap 118 imparts a return force (constriction force) onto the stud 102, as the circumferentially displaced metal cylinder 114 acts to return to the original shape. In other words, the circumferential expanded metal cylinder 114 acts as a spring, imparting a spring force on the elastomeric cylinder 122 and outer surface of the stud 102 in a direction toward the central cylindrical axis A. The combination of the deformable ribs 124 engaging the stud 102 and the spring force of the metal cylinder 114 urging the elastomeric cylinder 122 and outer surface of the stud 102 toward the central cylindrical axis A, taken together, provides a strong force fit (i.e., a friction fit or press fit) between the stud 102 and the self-retaining feature 116. Therefore, the connection between stud 102 and the self-retaining feature 116 resist forces along the axial direction (direction of the cylindrical axis A) and resist forces orthogonal to the axial direction.

In some embodiments, the compression of the plurality of ribs 124 (between the stud 102 and the metal cylinder 114) during installation creates a friction fit that allows the electronic housing module 100 to be self-retained, i.e., held in-place without the nut 110. For example, if the electronic housing module 100 is installed such that the first end 130 of the stud 102 is vertically above the second end 132 of the stud (i.e., the vehicle substrate is vertically above the electronic housing module 100), the installer would need to use one hand to hold the electronic housing module 100 in-place (as the force of gravity would pull it off the stud), and use a second hand to secure the washer 112 and/or nut 110 to the stud 102. However, with the self-retention function of the self-retaining feature 116, the installer would need only one hand to secure the washer and/or nut. Likewise, in some embodiments, the electronic housing module 100 is secured to a vehicle substrate vertically equal to the electronic housing module 100 (i.e., mounted to a side wall of the vehicle), and the self-retaining feature 116 holds the electronic housing module 100 in-place as the installer secures the washer 112 and/or nut 110.

In some embodiments, the first end 140 of the metal cylinder 114 contacts the washer 112 and/or the nut 110, and the second end 142 of the metal cylinder 114 contacts the vehicle substrate (not shown). The self-retaining feature 116 and the flange 106 are clamped between the washer 112 (or the nut 110) and the vehicle substrate. The clamping force is applied directly to the metal cylinder 114 rather than the polymeric flange 106. Because the flange 106 is formed from a polymeric material (e.g., a plastic polymer) the compressive force of the washer 112 and/or nut 110 (metal components less susceptible to deformation) may deform or damage the flange 106. In some embodiments, the self-retaining feature 116 is resistant to the compressive force (e.g., the metal cylinder 114 is resistant to deformation in the axial direction A) and therefore bears a majority of the compressive load. In other words, the compressive load is redirected from the flange 106 to the self-retaining feature 116. Thus, the self-retaining feature 116 limits the compressive force applied to the flange 106 and thereby protects the flange 106 from deformation and/or polymer creep.

In some embodiments, the stud 102 is threaded and includes a threaded outer surface. The plurality of ribs 124 engage the threaded outer surface of the stud 102, and in some embodiments, the deformable ribs 124 mate with the threading of the stud 102, i.e., the elastomeric material of the plurality of ribs 124 locks (deforms) against the threads on the stud 102 to provide a gripping feature to hold the stud 102 and the self-retaining feature 116 in-place.

In some embodiments, the stud 102 includes a cylindrical axis aligned with the central cylindrical axis A (see e.g., FIG. 2A). Because of the length of the side wall 120 of the self-retaining feature 116 and the close-fit between the stud 102 and the self-retaining feature 116, the cylindrical axis of the stud 102 is substantially aligned with the cylindrical axis A of the self-retaining feature 116. In some embodiments, this alignment is an intrinsic result of receiving the stud 102 within the opening of the self-retaining feature 116, i.e., because of the close fit between the two components and the rigidity of the two components (both formed of metal), there is no way to offset the cylindrical axes. This is beneficial during assembly, as misalignment between the stud and the aperture may cause deformation or damage to the polymeric flange 106 of the electronic housing module 100. In other words, if the electronics housing module 100 is torqued relative to the stud 102, the aperture 104 may deform or break. The intrinsic alignment of the self-retaining feature 116 with the stud 102 simplifies the assembly process.

In some embodiments, the elastomeric cylinder 122 is formed via injection molding the component directly onto the metal cylinder 114. For example, a mold is provided including a cavity having a negative of the metal cylinder 114 therein. The metal cylinder 114 is placed within the negative of the cavity and elastomeric material is injected into the mold. In some embodiments, an adhesive and/or other bonding element is positioned between the metal cylinder 114 and the elastomeric cylinder 122 to secure the two elements together. In some embodiments, the gap 118 in the metal cylinder 114 is filled with the elastomeric material, whereas in other embodiments (see e.g., FIG. 2C), the gap 118 is not filled with the elastomeric material.

Figure 3A:
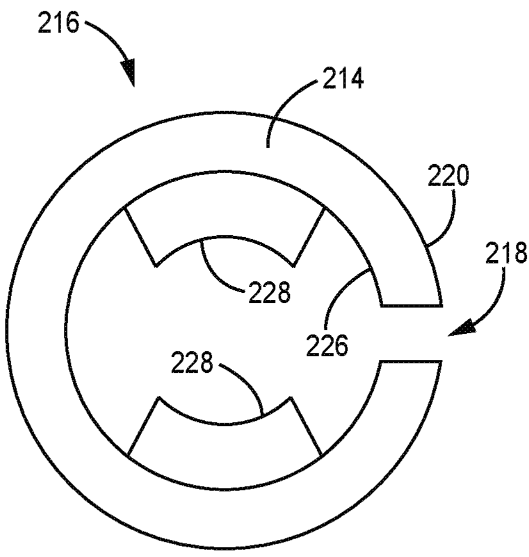
FIG. 3A illustrates a top view of a self-retaining feature, according to some embodiments.
Figure 3B:
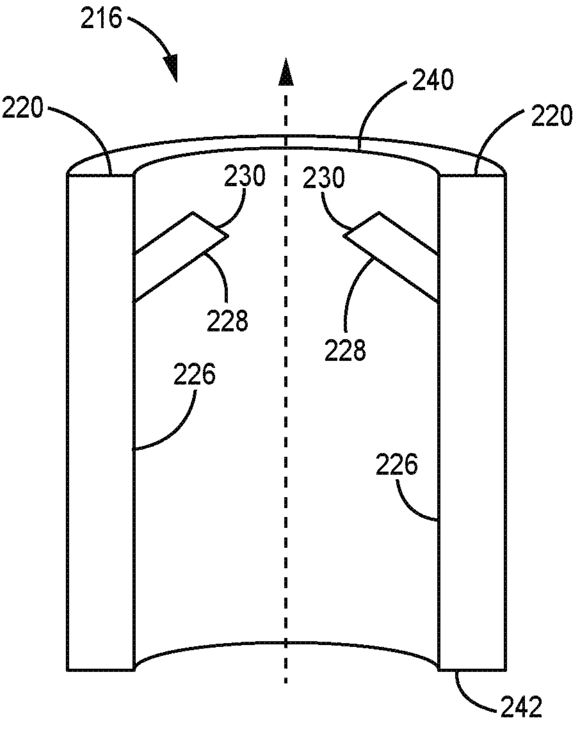
FIG. 3B illustrates a cross sectional side view of a self-retaining feature, according to some embodiments.

FIGS. 3A-B illustrate an alternative self-retaining feature 216 configured to be inserted into the aperture 104 of the electronic housing module 100, according to some embodiments. The self-retaining feature 216 includes a metal cylinder 214, a side wall 220, a gap 218 (i.e., an open slot in the side wall 220), an inner wall 226, and a pair of tabs 228 extending radially inward from the inner wall 226, and in some embodiments, the alternative self-retaining feature 216 includes any and/or all features of the self-retaining feature 116 described above.

The pair of tabs 228 (or in some embodiments, a plurality of tabs 228) engage the stud 102. In some embodiments, a distal end 230 of the pair of tabs 228 engages one or more threads of the stud 102 to prevent the self-retaining feature 216 from sliding off of the threaded stud 102. The pair of tabs 228 is angled (non-orthogonally) relative to the inner wall 226, and in some embodiments, the pair of tabs 228 is angled toward a first end 240 of the self-retaining feature 216. In some embodiments, the angled pair of tabs 228 allows the stud to travel unidirectionally toward the first end 240 of the self-retaining feature. In other words, the angled pair of tabs 228 allow the stud 102 to travel from a second end 242 of the self-retaining feature 216 to the first end 240 of the self-retaining feature 216, but once the threads of the stud 102 engage the pair of tabs 228, the reverse motion (the stud 102 moving from the first end 240 to the second end 242) is prevented. The angled par of tabs 228 provide unidirectional thread locking on the stud 102, according to some embodiments.

In some embodiment, the pair of tabs 228 are deformable, e.g., contact between the stud 102 and the pair of tabs 228 urges the pair of tabs 228 away from the cylindrical axis A. The pair of tabs 228 are cantilever at the side wall 220 and are unsupported at the distal end 230. In some embodiments, urging the pair of tabs 228 away from the cylindrical axis A generates a recoil force (i.e., a spring force) in a direction toward the cylindrical axis A. Thus, the pair of tabs 228 enable the self-retaining feature 216 to be held in-place on the stud 102.

The compression of the pair of tabs 228 (between the stud 102 and the metal cylinder 214) and/or the unidirectional thread locking (between the angled pair of tabs 228 and the threads on the stud 102) during installation creates a friction fit that allows the electronic housing module 100 to be self-retained, i.e., held in-place without the nut 110. For example, if the electronic housing module 100 is installed such that the first end 130 of the stud 102 is vertically above the second end 132 of the stud (i.e., the vehicle substrate is vertically above the electronic housing module 100), the installer would need to use one hand to hold the electronic housing module 100 in-place (as the force of gravity would pull it off the stud), and use a second hand to secure the washer 112 and/or nut 110 to the stud 102. However, with the self-retention function of the self-retaining feature 216, the installer would need only one hand to secure the washer and/or nut. Likewise, in some embodiments, the electronic housing module 100 is secured to a vehicle substrate vertically equal to the electronic housing module 100 (i.e., mounted to a side wall of the vehicle), and the self-retaining feature 216 holds the electronic housing module 100 in-place as the installer secures the washer 112 and/or nut 110.

In some embodiments, the first end 240 of the metal cylinder 214 contacts the washer 112 and/or the nut 110, and the second end 242 of the metal cylinder 214 contacts the vehicle substrate (not shown). The self-retaining feature 216 and the flange 106 are clamped between the washer 112 (or the nut 110) and the vehicle substrate. The clamping force is applied directly to the metal cylinder 214 rather than the polymeric flange 106. Because the flange 106 is formed from a polymeric material (e.g., a plastic polymer) the compressive force of the washer 112 and/or nut 110 (metal components less susceptible to deformation) may deform or damage the flange 106. In some embodiments, the self-retaining feature 216 is resistant to the compressive force (e.g., the metal cylinder 214 is resistant to deformation in the axial direction A) and therefore bears a majority of the compressive load. In other words, the compressive load is redirected from the flange 106 to the self-retaining feature 216. Thus, the self-retaining feature 216 limits the compressive force applied to the flange 106 and thereby protects the flange 106 from deformation and/or polymer creep.

In some embodiments, the self-retaining feature 216 is formed from a single sheet of metal and is pressed and/or stamped into shape. The one-piece, integrated construction minimizes cost and simplifies the supply chain. In other embodiments, the pair of tabs 228 are added onto the metal cylinder 214 via an injection molding process or other additive process.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

What is claimed is:

1. A system for housing electronic components for a vehicle:
- an electronic housing module configured to house electronic components;
- a flange for securing the electronic housing module to a substrate, the flange including a flat surface and an aperture extending through the flange;
- a self-retaining feature positioned within the aperture of the flange, the self-retaining feature including:
  - a metal cylinder including a side wall, an inner cylinder wall, and an opening extending through the metal cylinder along a cylindrical axis, and
  - a plurality of deformable features extending radially inward from the inner cylinder wall;
- a threaded stud; and
- a nut.

2. The system of claim 1, wherein the threaded stud is received through the opening of the metal cylinder and engages the plurality of deformable features.

3. The system of claim 2, wherein contact between the threaded stud and the plurality of deformable features urges the deformable features toward the inner cylinder wall of the metal cylinder and secures the self-retaining feature to the threaded stud.

4. The system of claim 3, wherein the nut is threadingly secured to the threaded stud, wherein the nut exerts clamping force upon the self-retaining feature.

5. The system of claim 4 further comprising a washer configured to matingly secure to the threaded stud and abut the flat surface of the flange, wherein the nut is configured to abut the washer, wherein the washer contacts the side wall of the metal cylinder, and wherein contact with the self-retaining feature prevents the clamping force from deforming the flange.

6. The system of claim 1, wherein the plurality of deformable features include a pair of angled tabs configured to engage the threaded stud.

7. An electronics module for a vehicle, the electronics module comprising:
- a housing including one or more electronics components therein;
- a flange including an aperture extending through the flange; and
- a self-retaining feature including:
  - a metal cylinder including a side wall, an inner cylindrical wall, and an opening extending through the metal cylinder in an axial direction, and
  - an elastomeric cylinder positioned on the inner cylindrical wall, the elastomeric cylinder including a plurality of ribs extending radially inward from an inner wall of the elastomeric cylinder.

8. The electronics module of claim 7, wherein the metal cylinder includes a gap in the side wall extending through the inner cylindrical wall in the axial direction.

9. The electronics module of claim 8, wherein a stud securable to a frame of the vehicle is receivable through the opening of the metal cylinder and through the aperture extending through the flange.

10. The electronics module of claim 9, wherein the plurality of ribs of the elastomeric cylinder is configured to engage a surface of the stud, and wherein the plurality of ribs of the elastomeric cylinder is deformable upon contact with the stud.

11. The electronics module of claim 10, wherein the gap in the side wall expands upon insertion of the stud within the opening, wherein expansion of the side wall generates a compressive spring force between the metal cylinder and the stud.

12. The electronics module of claim 11, wherein the self-retaining feature is positioned within the aperture of the flange, wherein a first end surface of the side wall of the metal cylinder is positioned flush with a flat surface of the flange.

13. A self-retaining feature for limiting compression of a flange, the self-retaining feature comprising:
- a metal cylinder including a cylindrical side wall, a first end, a second end, and an opening extending between the first end and the second end through the metal cylinder along a cylindrical axis;
- a gap in the side wall of the metal cylinder extending along an axial direction from the first end to the second end; and
- a plurality of deformable features extending radially inward from the cylindrical side wall.

14. The self-retaining feature of claim 13, further comprising an elastomeric cylinder positioned radially inward from the cylindrical side wall of the metal cylinder.

15. The self-retaining feature of claim 14, wherein the plurality of deformable features includes a plurality of elastomeric ribs extending along the axial direction between the first end and the second end of the metal cylinder.

16. The self-retaining feature of claim 15, wherein the plurality of elastomeric ribs deforms upon contact with a threaded stud inserted through the opening, wherein the plurality of elastomeric ribs lock with threads on the threaded stud.

17. The self-retaining feature of claim 13, wherein the plurality of deformable features includes a pair of tabs angled non-orthogonally relative to the cylindrical side wall.

18. The self-retaining feature of claim 17, wherein the pair of tabs are cantilevered on the cylindrical side wall and flexible to deform radially outward upon contact with a threaded stud inserted through the opening.

19. The self-retaining feature of claim 18, wherein a distal end of the pair of tabs engages a thread of the threaded stud to limit travel of the stud to a single direction.

20. The self-retaining feature of claim 13, wherein the gap in the side wall expands upon insertion of a threaded stud through the opening, wherein expansion of the gap in the side wall generates a compressive spring force between the metal cylinder and the threaded stud.

* * * * *